United States Patent [19]

Shinozaki et al.

[11] Patent Number: 5,217,779
[45] Date of Patent: Jun. 8, 1993

[54] MAGNETIC DISK CARTRIDGE

[75] Inventors: Akio Shinozaki, Tokyo; Toshio Sata, Kanagawa, both of Japan

[73] Assignee: Fuji Photo Film Co., Ltd., Kanagawa, Japan

[21] Appl. No.: 858,635

[22] Filed: Mar. 27, 1992

[30] Foreign Application Priority Data

Mar. 28, 1991 [JP] Japan .................. 3-064287

[51] Int. Cl.$^5$ .................. G11B 23/033; B65D 85/57
[52] U.S. Cl. ........................ 428/65; 428/68; 206/444; 360/133
[58] Field of Search ............... 206/444; 428/64, 65, 428/68, 75; 369/291; 360/133

[56] References Cited

U.S. PATENT DOCUMENTS

| | | | |
|---|---|---|---|
| 4,864,451 | 9/1989 | Iwasa et al. | 206/444 |
| 5,022,516 | 6/1991 | Urban et al. | 206/444 |

Primary Examiner—Alexander S. Thomas
Attorney, Agent, or Firm—Sughrue, Mion, Zinn, Macpeak & Seas

[57] ABSTRACT

A magnetic disk cartridge is comprised of a cartridge body and a magnetic disk, which is housed in the cartridge body. The cartridge body is constituted of a high-impact polystyrene resin, which contains elastic grains in a proportion ranging from 7% by weight to 10% by weight. The elastic grains have grain diameters not less than 1 μm. The elastic grains may be constituted of butadiene rubber. The cartridge body of the magnetic disk cartridge has high gloss and good abrasion resistance, and the magnetic disk cartridge can be manufactured at a low cost.

2 Claims, No Drawings

MAGNETIC DISK CARTRIDGE

BACKGROUND OF THE INVENTION

1. Field of the Invention

This invention relates to a magnetic disk cartridge which is used as a recording medium for computers, video devices, or the like. This invention particularly relates to an improvement in the material constituting a cartridge body of a magnetic disk cartridge.

2. Description of the Prior Art

Recently, magnetic disk cartridges are utilized as recording media for computers, video devices, or the like.

In general, a magnetic disk cartridge is provided with a cartridge body, which is constituted of an upper shell half and a lower shell half. A circular opening is formed at the center part of each of the upper and lower surfaces of the cartridge body. A magnetic disk is housed in the cartridge body such that a center core of the magnetic disk may face the circular openings formed at the center parts of the upper and lower surfaces of the cartridge body. Also an opening, into which a magnetic head of a signal recording unit is to be inserted, is formed at least in the upper surface or the lower surface of the cartridge body. Normally, the opening, into which a magnetic head of a signal recording unit is to be inserted, is closed by a shutter. The shutter is constituted of a metal, such as stainless steel. When a signal is to be recorded on the magnetic disk, the magnetic disk cartridge is fed into a signal recording unit. At this time, the shutter slides over the surface of the cartridge body. In this manner, the shutter moves away from the opening, into which the magnetic head of the signal recording unit is to be inserted. Thereafter, the magnetic head of the signal recording unit passes through the opening and comes into contact with the magnetic disk. When the recording of a signal is completed and the magnetic disk cartridge is discharged from the signal recording unit, the shutter slides over the surface of the cartridge body to the opening and closes the opening.

As described above, the shutter constituted of a metal slides over the surface of the cartridge body at the position of the opening, into which the magnetic head of the signal recording unit is to be inserted. Therefore, the cartridge body is easily abraded by the shutter, and some fragmentation of the cartridge body occur. The minute fragments of the cartridge body fall to the magnetic disk and cause drop-outs to occur. In order for such problems to be eliminated, ABS resins having good abrasion resistance have heretofore been employed as the materials constituting the cartridge bodies.

ABS resins have good abrasion resistance. However, the ABS resins are expensive. Therefore, in cases where an ABS resin is employed as the material constituting the cartridge body, the manufacturing cost of the magnetic disk cartridge cannot be kept low.

It may be considered that high-impact polystyrene, which is inexpensive, be employed as an alternative to the ABS resin. However, the abrasion resistance of high-impact polystyrene is poor. Therefore, in cases where high-impact polystyrene is employed as the material constituting the cartridge body, there is the risk that the drop-out occurrence rate cannot be kept low.

Also, from a commercial viewpoint, the magnetic disk cartridge should have a good appearance. Therefore, it is desirable that the cartridge body has a glossy finish.

SUMMARY OF THE INVENTION

The primary object of the present invention is to provide a magnetic disk cartridge, wherein the cartridge body has high gloss and good abrasion resistance.

Another object of the present invention is to provide a magnetic disk cartridge, which can be manufactured at a low cost.

The present invention provides a magnetic disk cartridge comprising a cartridge body and a magnetic disk housed in said cartridge body, wherein said cartridge body is constituted of a high-impact polystyrene resin, which contains elastic grains in a proportion ranging from 7% by weight to 10% by weight, wherein said elastic grains have grain diameters not less than 1 $\mu$m.

In the magnetic disk cartridge in accordance with the present invention, the elastic grains should preferably be constituted of butadiene rubber.

With the magnetic disk cartridge in accordance with the present invention, the cartridge body is constituted of a high-impact polystyrene resin containing the elastic grains.

The high-impact polystyrene resin is less expensive than the ABS resin, which has heretofore been utilized as the material constituting a cartridge body. Therefore, the manufacturing cost of the magnetic disk cartridge, in accordance with the present invention, can be kept low.

Also, the grain diameters of the elastic grains contained in the high-impact polystyrene resin are not less than 1 $\mu$m. The proportion of the elastic grains in the high-impact polystyrene resin is at least 7% by weight. Therefore, some of the elastic grains project from the surface of the high-impact polystyrene resin. As a result, a member, such as a shutter, which slides over the cartridge body, comes into contact with the elastic grains projecting from the surface of the high-impact polystyrene resin, and does not come into direct contact with the surface of the high-impact polystyrene resin. Accordingly, the surface of the high-impact polystyrene resin is not easily abraded, and little fragmentation of the high-impact polystyrene resin occurs.

Additionally, the proportion of the elastic grains, which will cause a decrease in the gloss of the cartridge body, is not more than 10% by weight. Therefore, with the magnetic disk cartridge in accordance with the present invention, the gloss of the cartridge body can be kept high.

DETAILED DESCRIPTION OF THE INVENTION

The present invention will hereinbelow be described in further detail.

As an embodiment of the magnetic disk cartridge, in accordance with the present invention, a 3.5-inch micro floppy disk was made, which was comprised of upper and lower shell halves (i.e. a cartridge body) and an 86 mm-diameter magnetic disk housed in the upper and lower shell halves. The storage capacity of the micro floppy disk was 2.0 megabytes. The cartridge body had an opening, into which a magnetic head of a signal recording unit is to be inserted, and a shutter for closing the opening.

The upper and lower shell halves were constituted of high-impact polystyrene containing butadiene rubber grains.

Which proportions of the butadiene rubber grains in high-impact polystyrene and which grain diameters of the butadiene rubber grains are suitable will be described hereinbelow. A plurality of samples of micro floppy disks were made, in which the proportion of the butadiene rubber grains in high-impact polystyrene, and the grain diameters of the butadiene rubber grains, varied as shown in Table 1. For each of the samples, a drop-out rating test was carried out under the conditions described below.

Drop-out Rating Test Conditions i) Method for determining drop-outs

Model MP-F73-W supplied by Sony Corp. was used as a floppy disk drive unit. Drop-outs were determined in accordance with JIS-X6223. Specifically, signal recording was carried out at the 2F frequency specified in JIS-X6223. At this time, a data recording bit at a recording amplitude (Op), which is less than 45% of one-half of the mean signal amplitude (pp) of the recorded signal, was determined as a drop-out. A diskette certifier, Model 5135, supplied by Mountain Computer Co. (U.S.) was used as a tester.

ii) Method for rating drop-outs

Operations for feeding each sample into the floppy disk drive unit and discharging it from the floppy disk drive were repeated 10,000 times. Thereafter, the drop-out occurrence rate was determined.

iii) Temperature and humidity at which drop-outs are determined

23° C., 50%

The results of the drop-out rating test on each sample and moldability of each sample are shown in Table 2. (In Table 2, the mark ○ indicates that the moldability is good, the mark Δ indicates that the moldability is slightly bad, and the mark X indicates that the moldability is bad). Also, as for cartridges having conventional upper and lower shell halves constituted of an ABS resin, rating tests were carried out in the same manner as that described above. The results of the rating tests and moldability of each sample are shown in Table 2.

As is clear from the results on sample Nos. 3 through 6 shown in Table 2, when a butadiene rubber having a larger grain diameter was employed, the drop-out occurrence rate decreased. However, as is clear from the results on sample No. 6, when the grain diameter of the butadiene rubber was not less than 3.0 μm, the moldability was slightly bad, and it was considered that the problem will occur with regard to the efficiency of mass production. However, even if the grain diameter of the butadiene rubber was not less than 3.0 μm, the moldability could be kept good by mixing an appropriate amount of rubber grains with a resin solution prior to the injection molding of the shell. Therefore, it was revealed that the grain diameter of the butadiene rubber should be not less than 1.0 μm.

Also, as is clear from the results on sample Nos. 1, 2, 5, and 7 shown in Table 2, when the amount of the butadiene rubber added was larger, the drop-out occurrence rate decreased. In particular, as is clear from the results on sample Nos. 5 and 7, better results were obtained when the proportion of the butadiene rubber was not less than 7%.

As for each of the sample Nos. 3 through 6, the gloss of the shell surface was rated visually. Specifically, the gloss of each sample was compared with the gloss of conventional upper and lower shell halves constituted of an ABS resin. The results of the comparison of the gloss are shown in Table 3. (In the gloss column in Table 3, the mark ○ indicates that the gloss of the sample was better than the gloss of the conventional shell surface, and the mark Δ indicates that the gloss of the sample was identical with the gloss of the conventional shell surface. Also, the mark X indicates that the gloss of the sample was worse than the gloss of the conventional shell surface.)

Also, the drop-out occurrence rate of each of sample Nos. 3 through 6 was compared with the drop-out occurrence rate of the conventional upper and lower shell halves constituted of an ABS resin. The results of the comparison of the drop-out occurrence rate are shown in Table 3. (In the drop-out occurrence rate column in Table 3, the mark ○ indicates that the drop-out occurrence rate of the sample was better than the dropout occurrence rate of the conventional shell, and the mark X indicates that the drop-out occurrence rate of the sample was worse than the drop-out occurrence rate of the conventional shell.)

As is clear from the results shown in Table 3, in order to yield high gloss, the proportion of the butadiene rubber should be not larger than 10% by weight.

From the combined rating of the gloss and the drop-out occurrence rate, it was revealed that the grain diameters of butadiene rubber grains should be not less than 1.0 μm, and the proportion of the butadiene rubber should fall within the range of 7% by weight to 10% by weight.

The samples, which had high gloss, had the effects of preventing the adherence of finger marks.

In the magnetic disk cartridge, in accordance with the present invention, the material of the elastic grains is not limited to the butadiene rubber, and may be selected from other rubbers and other elastic grain materials. Also, additives, such as anti-static agents, lubricants (e.g. silicone), and anti-oxidants may be added to the high-impact polystyrene resin.

TABLE 1

| Sample No. | Proportion of butadiene rubber (wt %) | Grain dia. (μm) |
| --- | --- | --- |
| Sample 1 | 1 to less than 4 | 1.0 to less than 3.0 |
| Sample 2 | 4 to less than 7 | 1.0 to less than 3.0 |
| Sample 3 | 7 to 10 | 0.2 to less than 0.5 |
| Sample 4 | 7 to 10 | 0.5 to less than 1.0 |
| Sample 5 | 7 to 10 | 1.0 to less than 3.0 |
| Sample 6 | 7 to 10 | 3.0 to less than 5.0 |
| Sample 7 | More than 10, but not more than 13 | 1.0 to less than 3.0 |

TABLE 2

| Sample No. | Drop-out occurrence rate (pcs.) | Moldability |
| --- | --- | --- |
| Sample 1 | 6/500 | ○ |
| Sample 2 | 5/500 | ○ |
| Sample 3 | 7/500 | ○ |
| Sample 4 | 5/500 | ○ |
| Sample 5 | 1/500 | ○ |
| Sample 6 | 0/500 | Δ |
| Sample 7 | 0/500 | ○ |
| Conventional (ABS resin) | 3/500 | ○ |

TABLE 3

| Sample No. | Drop-out occurrence | Gloss |
| --- | --- | --- |
| Sample 3 | X | ○ |
| Sample 4 | X | Δ |
| Sample 6 | ○ | Δ |

TABLE 3-continued

| Sample No. | Drop-out occurrence | Gloss |
| --- | --- | --- |
| Sample 6 | o | X |

What is claimed is:

1. A magnetic disk cartridge comprising a cartridge body and a magnetic disk housed in said cartridge body, wherein said cartridge body is constituted of a high-impact polystyrene resin, which contains elastic grains in a proportion ranging from 7% by weight to 10% by weight, said elastic grains having grain diameters not less than 1 μm.

2. A magnetic disk cartridge as defined in claim 1 wherein said elastic grains are constituted of butadiene rubber.

* * * * *